Nov. 11, 1969  J. CZINGULA  3,478,311
AUTOMOBILE PARKING ACCIDENT ALARM SYSTEM
Filed Nov. 22, 1967
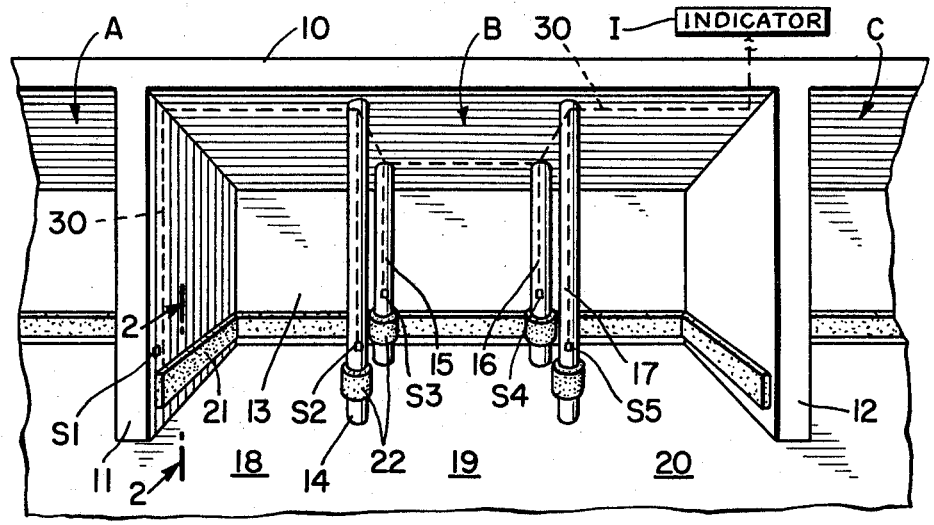
Fig.1.
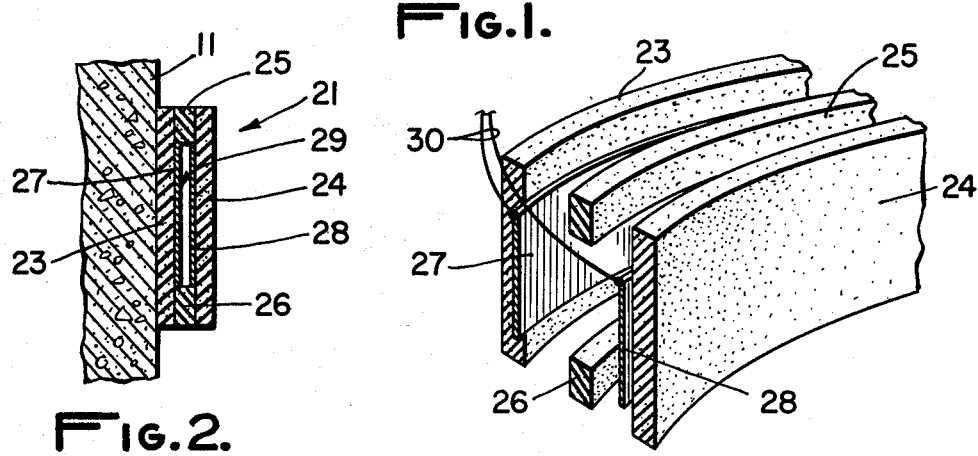
Fig.2.
Fig.3.
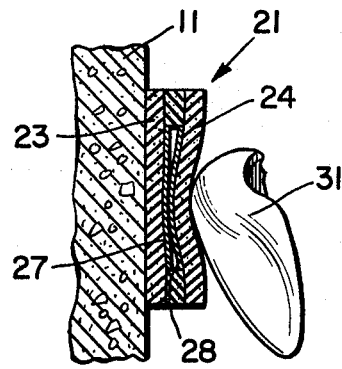
Fig.4.
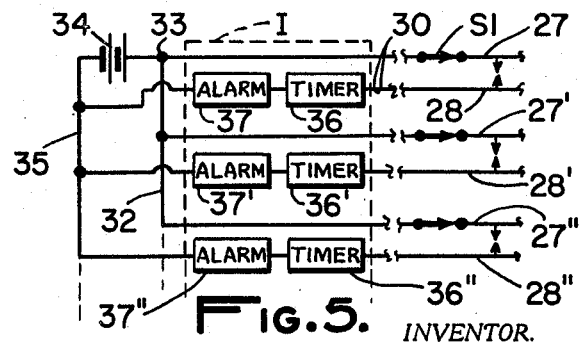
Fig.5.
INVENTOR.
JANOS CZINGULA
BY
Elliott & Pastoriza
ATTORNEYS

United States Patent Office 3,478,311
Patented Nov. 11, 1969

3,478,311
AUTOMOBILE PARKING ACCIDENT ALARM SYSTEM
Janos Czingula, Pacific Palisades, Calif.
(1532 Olympic Blvd., Santa Monica, Calif. 90404)
Filed Nov. 22, 1967, Ser. No. 685,158
Int. Cl. G08g 1/14
U.S. Cl. 340—51                                       4 Claims

ABSTRACT OF THE DISCLOSURE

One or more strips of sponge rubber incorporating first and second electrical conductors in spaced opposed relationship to each other are secured to the rear wall and vertical columns or other vertical structure defining garage areas. The sponge rubber is sufficiently resilient that should an automobile bumper or other portion of an automobile engage the strip, the conductors will make electrical contact with each other. A source of electrical energy and a suitable indicating means such as an alarm are connected in series to the conductors in the sponge rubber such that short circuiting of the conductors as a result of an automobile engaging the sponge rubber completes a circuit through the indicating means to sound an alarm. Individual indicating means may be provided for individual strips of sponge rubber in adjacent garage areas so that an alarm by a particular indicating means will indicate the particular garage in which an accident occurred. In addition, a time clock may be incorporated in the circuit to automatically record the time of such accident.

---

This invention relates generally to alarm systems and more particularly to an alarm system for use in garage areas for providing an indication of an accident or engagement of an automobile with portions of the garage structure when parking.

Many automatic alarm dveices for facilitating the parking of automobiles in garages or similar areas have been provided. Generally, these devices take the form of a flexible member which is engaged by an automobile when the automobile has reached a proper position in a garage to sound an alarm and indicate to the driver such position.

However, there has not been available to a suitable alarm means which will indicate an accident occurring in a garage area as a result of engagement of an automobile with one of the walls or vertical columns defining the garage areas. There is a definite need for such an alarm system particularly in office buildings and apartment buildings having multiple garage parking areas. In these situations, there is often provided a parking attendant who will park cars and then later on deliver them to various tenants of the office building or apartment house. With a suitable alarm system such as contemplated, an indication would be immediately provided of any accident occurring during the parking or removal of the car.

With the foregoing considerations in mind, it is a primary object of the present invention to provide an automobile parking accident alarm system particularly useful for multiple garages for providing an indication of any engagement of an automobile with any of the surrounding structure defining the garage areas.

More particularly, it is an object to provide an alarm system meeting the foregoing object wherein a particular indication will designate a particular garage area wherein an accident or engagement of a car with a garage area occurs when the system is employed in multiple garages.

Still another important object of this invention is to provide an alarm system meeting the foregoing objects which is extremely simple and economical to manufacture and operate.

An auxiliary object of this invention is to provide a unique alarm system responsive to engagement between two bodies to thereby indicate such engagement.

Briefly, these and other objects and advantages of this invention are attained by providing basically a resilient means preferably in the form of a strip of sponge rubber having a hollow interior portion. First and second conducting means in turn are positioned in spacing opposing relationship within this interior portion. The arrangement is such that a squeezing of the sponge material will cause the conductor means to make electrical contact with each other.

An indicating means and source of electrical energy are connected in series, this series circuit being connected across the first and second conductors within the strip sponge material. With this arrangement, short circuiting of the conductors within the sponge material as a result of squeezing of the sponge material will energize the indicating means and sound a suitable alarm. By providing the sponge material in the form of elongated strips, it may readily be attached to wall areas defining the garage at a level corresponding to the height of bumpers on automobiles. It may also readily be wrapped around vertical columns or other similar structures defining the garage area.

Additional strips may be employed for additional garage areas as in the case of multiple parking facilities and suitable indicating means individually provided for the respective strips. An area at which engagement of the strip by an automobile occurs will thus be designated by the corresponding indicating means. In addition, the indicating means may include a time clock to record the exact time that any accident occurs.

A better understanding of the invention as well as its various features and advantages will be had by now referring to the accompanying drawings, in which:

FIGURE 1 is a fragmentary perspective view of a multiple garage parking area utilizing the present invention;

FIGURE 2 is a fragmentary cross section of a portion of the alarm means taken in the direction of the arrows 2—2 of FIGURE 1;

FIGURE 3 is an exploded fragmentary perspective view of the portion of the alarm system illustrated in FIGURE 2;

FIGURE 4 is a view similar to FIGURE 2 useful in explaining the operation of the invention; and, FIGURE 5 is a simplified schematic electrical circuit diagram for the system shown in FIGURE 1.

Referring first to FIGURE 1 there is shown a multiple garage parking structure 10 including vertical side walls 11 and 12 and a rear wall 13. Specific parking areas are further defined by vertical supporting structures such as columns 14, 15, 16, and 17. Additional garage areas may be defined in part by the side walls 11 and 12. Thus, in FIGURE 1 there is illustrated, partly in fragmentary form, three garage areas A, B, and C. Each of these areas could be designed to accommodate only a single car or multiple cars such as indicated by the specific garage areas at 18, 19, and 20 for the central structure B.

In accord with the present invention, the vertical structures defining the garage areas are provided with a resilient material in the form of an elongated strip of sponge rubber 21 running horizontally along the side walls and rear wall 13 as shown. The level of this strip corresponds to that of an automobile bumper. In addition, further strips of sponge rubber such as indicated at 22 encircle the columns 14, 15, 16, and 17 at a similar level.

The elongated strips of sponge rubber are formed in the same manner and differ only in their overall length. Description of one will thus suffice for all.

Thus, referring to FIGURE 2 the elongated strip 21 is shown as comprised of a pair of relatively thin wide strips 23 and 24 and a pair of relatively narrow thin strips 25 and 26 sandwiched between the upper and lower edges of the wide strips 23 and 24. First and second conducting preferably in the form of aluminum foil are secured to the inner opposed faces of the wide strips 23 and 24 such as indicated at 27 and 28 thereby being held in spaced opposing relationship. In this respect, the opposing faces of the foil together with the upper and lower thin strips 25 and 26 define a hollow interior portion 29 within the overall sponge material.

From FIGURE 2, it will be evident that the sponge strip is of rectangular cross section and the hollow interior portion of a smaller rectangular cross section.

FIGURE 3 shows in exploded view the various elements making up the sponge strip of FIGURE 2 and in the actual forming of the sponge strip, the wide thin strips 23 and 24 have secured to opposing faces the aluminum foil strips 27 and 28, this foil being somewhat narrower to leave free upper and lower margins. The thin arrow strips 25 and 26 in turn extend above the upper and lower edges of the foil and thus when the sponge rubber strips are all assembled to provide a single elongated strip of sponge rubber, the structure of FIGURE 2 results.

In the showing of FIGURE 3, it will be noted that there are provided conductors or leads 30 connected to the aluminum foils 27 and 28 respectively. These leads connect to suitable indicating means. For example, with reference once again to FIGURE 1, the leads are depicted by the dashed lines 30 and are shown as extending up the wall and across the ceiling and down the various columns to effect connection with various conducting means in the various strips. The leads eventually connect to an indicator I as shown in FIGURE 1.

Referring now to FIGURE 4, there is illustrated at 31 an automobile bumper engaging the exterior of the sponge rubber strip and it will be evident that the squeezing force exerted thereon causes the conducting foil 28 to make electrical contact with the conducting foil 27. When disengagement of the bumper 31 occurs, the resilient nature of the sponge material will cause the strip to resume the shape as shown in FIGURE 2 wherein the aluminum foils are out of electrical contact with each other.

Referring now to FIGURE 5, there are depicted schematically the conducting foil as by the leads 27 and 28 and corresponding conducting foil employed in additional sponge strips in adjacent garage areas by the leads 27', 28', and the leads 27" and 28". One of the conductors within the strip such as 27 connects to a corresponding lead or conductor of the pair of conductors 30 to a common lead 32. This common lead 32 connects to various other ones of the foil strips represented by the numerals 27' and 27". One common junction of the circuit such as indicated at 33 is adapted to be connected to a source of electrical energy depicted in FIGURE 5 as a battery 34. The other side of the battery 34 connects to a second common lead 35 in turn connected to the indicating means within the dashed box I. For example, there is shown indicating means in the form of a time clock 36 and an alarm 37. These are effectively connected in series with the battery 34 to define a series circuit which in turn connects across the leads 27 and 28 such that short circuiting of these leads will complete a circuit to the indicating means. Similarly, there may be provided additional indicating means as at 36' and 37' in the form of a time clock and an audible alarm and as at 36" and 37" for the corresponding foil conductors in additional strips.

Because of the series connections as described, it will be evident that short circuiting of the pairs of conductors 27 and 28, 27' and 28', or 27" and 28" will result in energization of the corresponding series connected indicators.

The circuit of FIGURE 5 is employed for multiple garage areas and the respective indicating means will provide an indication as to which particular area an accident occurred.

The circuit of FIGURE 5 also includes manually operable switches such as indicated at S1, these various switches being distributed about the garage area as further indicated at S2, S3, S4, and S5 in FIGURE 1. The purpose for the switches is to enable cutting out of the circuit certain sponge strip portions in the event that they should become inadvertently short circuited or in the event that they should not resume their natural shape after a car bumper has been removed from engagement therewith.

With the foregoing description of the various components making up the invention in mind, its overall operation will now be described.

Initially, elongated strips of the sponge rubber incorporating the foil conductors are cut to a proper length and positioned around the garage supporting structure as described in conjunction with FIGURE 1. The conducting leads 30 connecting to the conductors within the sponge rubber strips are then passed to an indicator and connected to a source of electrically energy as described in FIGURE 5.

The manually operable switches S1 through S5 are all normally closed.

Under the above conditions, no alarm will be sounded and the various time clocks described as a part of the indicating means will be recording normal time. If now an attendant or other person parks a car and accidentally engages the rear wall, side wall, or one of the columns, the correspondingly positioned sponge rubber strip will be squeezed as described in FIGURE 4 to short circuit the aluminum foil conductors therein. A circuit will then be completed as described in FIGURE 5 through the indicating means associated with the particular conductors. Energization of this indicating means will cause automatic marking of the time that the accident or engagement occurred and in addition will sound an audible alarm. The driver or owner of the building is thus immediately appraised of the accident. In this respect, it is, of course, possible to provide multiple indicating means at various locations in the building to warn the driver as well as to warn a manager of the building at a remote area.

Should damage occur to any of the strips which causes a permanent short circuiting of the conductors therein, the corresponding manually operable switch may be thrown an an open position to cut that portion of the sponge rubber strip out of the circuit.

From the foregoing description, it will be evident that the various objects set forth heretofore are fully realized by the present invention.

What is claimed is:

1. A system for indicating an accident when parking an automobile, comprising, in combination: a plurality of garage areas defined by vertical dividing structures; a resilient means in the form of elongated strips secured to said structures at a level corresponding substantially to that of an automobile bumper, said strips having hollow interior portions; first and second conducting means within said interior portions in spaced opposed relationship to each other such that squeezing of a strip results in the conducting means therein making electrical contact with each other; a source of electrical energy; and a plurality of indicating means associated with said plurality of garage areas and strips therein connected to said source, said first and second conducting means being connected to said source and said indicating means, respectively such that an electrical circuit is completed through an indicating means whenever the first and second conducting means in a corresponding strip make electrical contact with each other, whereby said indicating means is energized to indicate engagement of said resilient means by an automobile, energizing of a given one indicating means indicating a particular one of said strips to thereby identify a particular garage area at which engagement of said strip occurred.

2. The subject matter of claim 1, in which said indicating means includes a time recording means for indicating the time of engagement of one of said strips and an alarm means providing an audible signal to warn a driver of an automobile of engagement with said one of said strips.

3. The subject matter of claim 2, including a switch for enabling manual disconnection of one of said conducting means in a given strip to said indicating means to render said given strip inoperative in the event a short circuit between said first and second conducting means occurs in the absence of a squeezing engagement of said strip.

4. The subject matter of claim 1, in which said first and second conducting means comprise foil strips with their planar surfaces in opposing relationship within said hollow interior portion.

References Cited
UNITED STATES PATENTS

| | | | |
|---|---|---|---|
| 2,178,315 | 10/1939 | Sweetland | 340—51 |
| 2,181,728 | 11/1939 | Greentree | 340—31 X |
| 2,625,621 | 1/1953 | Roby. | |
| 2,658,967 | 11/1953 | Matschke | 340—61 X |
| 2,728,827 | 12/1955 | Towle | 200—86 |
| 2,761,928 | 9/1956 | Cooper et al. | 340—272 X |
| 2,843,690 | 7/1958 | Miller | 200—61.43 |
| 2,979,694 | 4/1961 | Lamberti | 340—61 |
| 3,260,812 | 7/1966 | Miller | 200—86 X |
| 3,303,303 | 2/1967 | Miller | 200—61.43 |
| 3,334,484 | 8/1967 | Turgeon | 200—86 X |
| 3,395,387 | 7/1968 | Durant | 340—61 |

JOHN W. GALDWELL, Primary Examiner

K. N. LEIMER, Assistant Examiner

U.S. Cl. X.R.

200—52, 153; 340—61